US012655826B2

(12) United States Patent
Price

(10) Patent No.: US 12,655,826 B2
(45) Date of Patent: Jun. 16, 2026

(54) TIDE- AND WIND-POWERED TURBINE, CONVERSION AND STORAGE SYSTEM

(71) Applicant: Zara Ara Price, Marathon, FL (US)

(72) Inventor: Zara Ara Price, Marathon, FL (US)

( * ) Notice: Subject to any disclaimer, the term of this patent is extended or adjusted under 35 U.S.C. 154(b) by 0 days.

(21) Appl. No.: 19/231,961

(22) Filed: Jun. 9, 2025

(65) Prior Publication Data

US 2026/0063106 A1     Mar. 5, 2026

Related U.S. Application Data

(60) Provisional application No. 63/687,907, filed on Aug. 28, 2024.

(51) Int. Cl.
| | |
|---|---|
| *F03D 9/00* | (2016.01) |
| *F03D 7/02* | (2006.01) |
| *F03D 7/04* | (2006.01) |
| *F03D 9/25* | (2016.01) |
| *F03D 80/70* | (2016.01) |

(52) U.S. Cl.
CPC ........... *F03D 9/008* (2013.01); *F03D 7/0224* (2013.01); *F03D 7/042* (2013.01); *F03D 9/255* (2017.02); *F03D 80/70* (2016.05); *F05B 2240/50* (2013.01); *F05B 2260/42* (2013.01); *F05B 2260/70* (2013.01)

(58) Field of Classification Search
CPC .......... F03D 9/008; F03D 9/255; F03D 80/70; F03D 7/0224; F03D 7/042; F05B 2240/50; F05B 2260/42; F05B 2260/70
See application file for complete search history.

(56) References Cited

U.S. PATENT DOCUMENTS

| | | | |
|---|---|---|---|
| 3,026,088 | A | 3/1962 | Green |
| 7,902,687 | B2 | 3/2011 | Sauer et al. |
| 8,022,567 | B2 | 9/2011 | Davis et al. |
| 8,096,750 | B2 | 1/2012 | McEntee et al. |
| 8,177,480 | B2 | 5/2012 | Petrounevitch et al. |
| 8,310,077 | B2 | 11/2012 | Pearce |
| 8,459,020 | B1 | 6/2013 | Swamidass |
| 8,475,133 | B2 | 7/2013 | Baker |
| 8,946,922 | B1 | 2/2015 | Johnson |

(Continued)

*Primary Examiner* — Sean Gugger

(74) *Attorney, Agent, or Firm* — Dunlap Bennett & Ludwig PLLC; Anna L. Kinney

(57) ABSTRACT

An electricity generation system employs a tide- and wind-powered turbine featuring an inverted blade configuration, where the blades extend inward from an outer ring, creating a central void for fluid passage and optimizing energy capture efficiency. The system includes advanced components such as an axial radial flux motor, ball bearings, and a variable pitch mechanism for dynamic blade adjustment. It is adaptable for mounting on bridges, pipelines, or power transmission towers and incorporates innovative motor technologies, including crystal motors, to achieve efficient energy conversion. The system supports bidirectional flow environments, ensuring continuous power generation, and integrates energy storage devices such as saltwater batteries to store excess energy. Designed for sustainable, 24-hour electricity generation with minimal environmental impact, the system is suitable for infrastructure-based installations, marine vessels, and small-scale devices, offering versatile applications across diverse environments.

19 Claims, 8 Drawing Sheets

(56)        References Cited

U.S. PATENT DOCUMENTS

| | | | |
|---|---|---|---|
| 10,288,041 B2 | 5/2019 | Williams | |
| 10,502,184 B2 | 12/2019 | Bray | |
| 10,731,624 B2 | 8/2020 | Tse | |
| 11,378,282 B2 | 7/2022 | Field et al. | |
| 11,744,047 B2 | 8/2023 | Koerner et al. | |
| 2010/0133844 A1* | 6/2010 | Pearce | F03B 13/264 |
| | | | 415/110 |
| 2012/0001435 A1 | 1/2012 | Pearce et al. | |
| 2012/0274066 A1* | 11/2012 | Montgomery | F03B 13/00 |
| | | | 415/220 |
| 2018/0291872 A1* | 10/2018 | Lai | F03D 7/0276 |
| 2020/0149511 A1* | 5/2020 | Hug | F03D 7/06 |
| 2020/0224632 A1 | 7/2020 | Lin | |
| 2021/0199091 A1 | 7/2021 | Hopkins et al. | |
| 2022/0372951 A1* | 11/2022 | Mirzeabasov | F03D 3/064 |
| 2023/0268768 A1 | 8/2023 | Guillaume et al. | |

* cited by examiner

26

26

20

20

TIDE- AND WIND-POWERED TURBINE, CONVERSION AND STORAGE SYSTEM

CROSS-REFERENCE TO RELATED APPLICATION

This application claims the benefit of priority of U.S. provisional application No. 63/687,907, filed Aug. 28, 2024, the contents of which are herein incorporated by reference.

BACKGROUND OF THE INVENTION

The present invention relates to systems and devices for generating energy and, more particularly, to a tide- and wind-powered turbine, conversion, and storage system.

Power plants have a difficult time maintaining enough supply to meet society's current demand. As society grows, demand will grow, and the problems of a mismatch between supply and demand will grow. Further, these plants require fuel to generate and deliver power to population centers. Trees/forests, plants, water sources, and other natural resources used to sustain populations are destroyed in the process of drilling and mining for these fossil fuels. Not only is sustainability an issue, but the carbon emissions generated by each power plant harm the earth's atmosphere. We need no more damage to our earth.

Most energy resources do not provide 24-hour sustainable electricity and have a lot of outdated add-on devices that are considered an environmental and/or economic concern. As the world is right now, it's about time for a new economical way to produce electricity. It's time for us to use what we have and make more money with less hassle.

As can be seen, there is a need for improvements in power generation and delivery systems.

SUMMARY OF THE INVENTION

In one embodiment of the present disclosure, an electricity generation system is provided that comprises an energy extractor operable to extract kinetic energy from a fluid flow, an energy transmitter, and an energy dissipator. In various aspects, the energy extractor is selected from either a turbine having an axis of rotation parallel to the fluid flow, a water wheel having an axis of rotation perpendicular to the fluid flow, or any combination thereof. Additionally, the turbine may feature blades arranged in an inverted fan configuration and may further comprise elements such as magnets mounted to a wheel, a protective casing, fiberglass components and/or components formed from recycled material, retractable blades, and a plurality of ball bearings. In various aspects, the turbine may be mounted to a bridge, an electricity transmission tower, or within a pipe. Moreover, the system may further comprise an inversion box that is electrically coupled to an electric grid. Accordingly, the energy transmitter may be chosen from a hydraulic pump with an electrical circuit, an electric power line, an air compressor, a water pump, or combinations thereof. The energy dissipator may comprise a generator, an air-driven tool, a battery array, water that exhibits a temperature rise upon energy transmission, an electric motor, or any combination thereof. Furthermore, in some embodiments, an energy storage device is also provided, which may be selected from a pressure accumulator, a compressed air storage tank, an elevated water tank, or a battery array— wherein the battery array comprises, for example, a saltwater battery, a solid-state battery, or any combination thereof.

In embodiments of the present disclosure, an inverted turbine apparatus for generating electrical energy from a fluid flow is provided. This apparatus comprises a housing with an outer peripheral wall defining a central void adapted to permit fluid passage, and a blade assembly mounted on an inner surface of the housing wherein the turbine blades are arranged in an inverted configuration, each extending radially inward toward the central void. A motor assembly— such as an axial radial flux motor having a rotor incorporating high-strength permanent magnets and a stator configured to convert rotational energy into electrical energy—is operatively coupled to the blade assembly. Additionally, the apparatus includes a bearing assembly formed by a plurality of bearings to support the rotational movement with reduced friction. In various aspects, the apparatus may include a variable pitch mechanism operatively connected to the blade assembly for dynamically adjusting the orientation of the turbine blades in response to fluid flow conditions and a protective cover disposed at least partially about the housing and blade assembly to shield the components from environmental debris. A mounting interface may be provided to secure the housing to a support structure selected from a bridge structure, a pipeline, or a power transmission tower, thereby enabling the conversion of kinetic energy from the fluid flow into electrical energy.

In a further embodiment of the present disclosure, a method of electricity generation is provided, comprising the steps of positioning a turbine having an inverted fan blade configuration at a selected installation site, wherein the turbine may be mounted to a bridge, a power line support, or a pipe. Accordingly, the method further comprises extracting kinetic energy from a fluid flow by allowing the turbine blades to rotate as the fluid impinges upon an inner region of the turbine and converting the extracted kinetic energy into electrical energy by driving an electric motor— selected, for example, from an axial radial flux motor or a crystal motor—that is operatively coupled to the turbine. In various aspects, the method further comprises operating the turbine in a bidirectional fluid flow environment by directing fluid through a flow gate mechanism configured to maintain unidirectional rotation during alternating flow conditions, automatically monitoring environmental conditions via integrated sensors, and adjusting a variable pitch mechanism to modulate blade orientation in accordance with changes in fluid flow or adverse weather conditions—which may include actuating a retractable blade mechanism when predetermined thresholds are met. The generated electrical energy is subsequently transmitted through an inverter configured for high-voltage direct current output to an electrical grid, and any excess energy is stored in an energy storage device.

These and other features, aspects and advantages of the present invention will become better understood with reference to the following drawings, description, and claims.

DETAILED DESCRIPTION OF THE INVENTION

Figure 1:
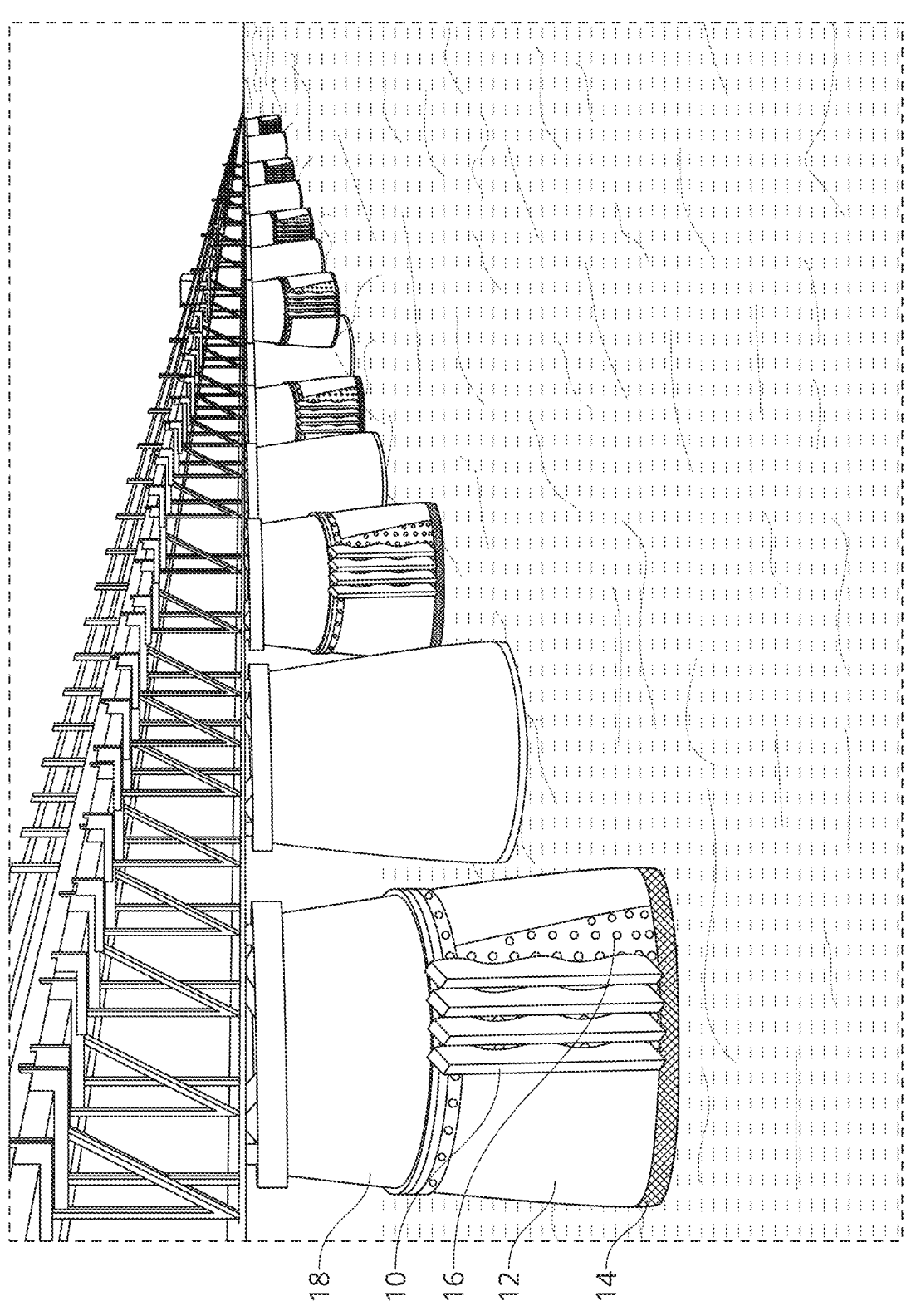
FIG. 1 is a schematic view of a clip-on turbine according to an embodiment of the present invention, shown in use.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

buildings, automotive airflow harvesting systems, waterways, industrial facilities, and gas, oil, or machinery applications. Additional opportunities for energy harvesting include installations in water towers and mines, where fluid flow can be harnessed to generate electricity.

For power transmission tower applications, the turbines may be mounted directly to the tower structure. When installed near the base, they can capture tidal energy in marine crossing environments, while installations at higher elevations are optimized to harness wind energy. This adaptability makes the turbine system suitable for a wide range of deployment scenarios.

The system requires barely any maintenance, is long-lasting without replacement, e.g., about 50 to 100 years, and has no $CO_2$ footprint. The inventive system does not produce dirty water, earthquakes, or volcanoes. In some embodiments, the units may run at least a month at a time.

The turbine system features a modular design that simplifies manufacturing and maintenance while ensuring compatibility across diverse deployment scenarios. Some examples of modular combinations are shown in the table below.

| Function | Example 1 | Example 2 | Example 3 | Example 4 | Example 5 |
|---|---|---|---|---|---|
| Energy extraction | Turbines in parallel: axis of rotation parallel to water flow | Turbines in series: axis of rotation parallel to water flow | Water wheel with generator: axis of rotation perpendicular to water flow | | |
| Energy transfer | Hydraulic pump and circuit | Direct electricity generation | Air compressor | Water pump | |
| Energy storage | Accumulator - hydraulic pressure | Compressed air storage tank | Elevated water tank | Battery array (lead acid, hydrogen hybrid, or NiMH) | Direct electricity generation (no storage) |
| Energy dissipation | Hydraulically driven generator | Air-driven tools or an air-driven generator | Gravity-fed hydroelectric generator | DC connection to battery array | Heated water |

Broadly, one embodiment of the present invention is a tide and wind powered turbine for power generation, converter for energy conversion, and storage system for storing power. The turbine may be an element of a generator system comprising an energy extractor, an energy transmitter, and an energy draw component.

In some embodiments, the generator system may further comprise an energy storage device.

The turbine system is designed to provide sustainable, 24-hour electricity generation with minimal environmental impact. It eliminates the need for power plants, mining, dams, and large battery storage, offering a lightweight, easy-to-install solution that requires minimal maintenance and has no $CO_2$ footprint.

Industrial applications include recovering energy from fluid transport systems, water towers, and mines, while transportation applications utilize compact turbines in air intake or exhaust pathways to capture airflow during operation. The system is particularly well-suited for environments with continuous natural energy sources, such as tidal flows and consistent wind currents near bridges. Potential installation sites include communication support infrastructures, electrical distribution structures, utility support systems, Grid Interface The electricity generation system generally incorporates a high-voltage direct current (DC) bus architecture designed for enhanced operational efficiency. This high-voltage architecture enables more efficient power transmission, particularly in applications requiring significant power transfer over distance or in higher output configurations. The system's electrical components, including inductors and control circuitry, operate reliably within this high-voltage environment. This advanced electrical architecture contributes to the system's ability to maintain stable output characteristics even under variable input conditions, such as fluctuating water flow or wind speeds. The high-voltage DC bus design also facilitates more efficient integration with modern power electronic components, enhancing the system's compatibility with grid-connection equipment or battery storage systems.

The system incorporates standardized grid interface components, including an inverter module that conditions the generated power to match grid frequency and phase requirements, protective circuitry that prevents backfeed during grid outages, and smart metering capabilities that enable bidirectional power flow accounting. Multiple turbine installations can be connected in parallel to aggregate power output before transmission to the grid, with each turbine contributing independently to the combined generation capacity.

Vehicle/Automotive/Transport Applications

In vehicle applications, miniaturized versions with aerodynamic housings position the turbines to capture energy from airflow during operation while minimizing drag coefficients and maintaining the vehicle's performance characteristics.

In automotive settings, compact turbines can be installed in vehicle air intake or exhaust pathways to capture energy from airflow generated during operation, supplementing onboard power generation.

Aviation applications utilize lightweight variants with precise balance characteristics and aerodynamic profiles that integrate seamlessly with aircraft surfaces without compromising flight characteristics. Aircraft implementations position turbines in locations, such as within the fuselage or wing structures, that experience consistent airflow during flight, supplementing onboard power generation without increasing fuel consumption.

Marine vessel installations utilize hydrodynamic mounting systems that minimize drag while positioning the hull-mounted turbine to optimize energy capture from water flow around the hull during navigation.

Electronic Components

The electricity generation system may also incorporate advanced integrated intelligence systems that continuously optimize performance based on environmental conditions and operational parameters. A specialized microchip controls the system, managing multiple sensor inputs such as temperature, pressure, flow rate, rotational speed, vibration, and electrical output characteristics. This integrated intelligence enables real-time adjustments to blade pitch, generator loading, and system orientation to maximize energy capture across varying environmental conditions. Predictive algorithms analyze pattern data from environmental sensors to anticipate changes in operating conditions and proactively adjust system parameters before performance degradation occurs. In multi-unit deployments, the intelligence systems communicate between turbine units to optimize collective performance, with upstream units providing operational data to downstream units for coordinated control strategies. The system includes self-diagnostic capabilities that identify potential maintenance requirements before performance issues arise, enabling predictive maintenance scheduling rather than reactive repairs. Remote monitoring capabilities allow for centralized oversight of distributed installations, with secure communications protocols enabling firmware updates and performance optimization adjustments without requiring physical access to deployed units. This integrated intelligence system significantly enhances the overall efficiency of the turbine system, providing a distinct advantage over conventional technologies that lack comparable adaptive capabilities.

The turbine may be equipped with multiple measurement points for performance monitoring, including upstream and downstream pressure transducers, RPM sensors, torque measurement, temperature monitoring, and power output metering.

The electricity generation system generally incorporates a sophisticated control and monitoring system to optimize performance. It utilizes high-voltage DC architecture with an 800V DC bus for higher speed operation. The system logs key parameters such as voltage output, pressure drop, RPM, torque, temperature, and power output using dedicated data acquisition channels. High-frequency Pulse Width Modulation controllers, Hall sensors for rotor position sensing, and integrated heating and cooling management ensure optimal operating conditions. This integrated control and monitoring approach enables real-time performance optimization while providing diagnostic capabilities for preventative maintenance.

Retrofitting Existing Systems

The turbine system is adaptable for a wide range of applications, including integration into pipelines, bridge supports, power transmission towers, vehicles, airplanes, and marine vessels. The turbine enables a simple upgrade of power generation and delivery systems to generate and deliver environmentally friendly 24-hour sustainable energy. Pre-existing power plants and delivery systems may be upgraded to produce sustainable energy by replacing or supplementing fossil fuel dependent power plants with natural-resource-driven turbines, energy conversion systems, and battery storage systems.

For utility infrastructure installations, the system integrates directly with existing power line structures and transmission systems, enabling energy harvesting from natural air movements without requiring additional land use or dedicated infrastructure. The system integrates a direct grid connection architecture, eliminating the need for extensive transmission infrastructure and enabling immediate integration with existing power lines.

For pipeline installations, the system employs specialized mounting and connection systems, such as CPVC bin flanges, isolation valves, PVC piping, specialized couplings, and dynamic movement joints, to ensure seamless integration with existing fluid transport infrastructure. A dynamic movement joint is a structural component designed to accommodate movement caused by external forces such as thermal expansion, seismic activity, or differential settlement. It allows connected elements to shift or flex without compromising the integrity of the structure, ensuring stability and durability in environments subject to dynamic stresses. In applications requiring dynamic movement accommodation, components like the W257 Dynamic Movement Joint are utilized, capable of handling up to 4 inches of movement caused by differential settlement, seismic activity, or thermal expansion. For larger diameter installations, the system incorporates a flexible coupling with a wedge-shaped key profile to increase allowable pipe end separation, supporting sizes ranging from 14 to 78 inches with pressure ratings up to 350 psi. In water management applications, the system features specialized housing and sealing systems designed for integration into municipal water systems, industrial water networks, and irrigation infrastructure, capturing energy from water flow that would otherwise be dissipated.

Scale Up

Turbine size and electrical power is only limited by the applied force and flow rate of the media that it is applied in and the size limitation of the environment. Generally, the turbine wheel is at least about 8 inch in diameter.

Standardized manufacturing processes allow for scaling across a size range from small-scale distributed energy generation to utility-scale power production. The electricity generation system produces varying power outputs based on turbine size and operational conditions. In operational testing, the 8-inch turbine configuration was shown to generate between 3 and 10 kilowatts per unit while maintaining an exceptionally high torque value of approximately 660 newton meters. When scaled to a 5-foot diameter, the system produced approximately 1 megawatt of continuous power, while larger installations of 10 to 20 feet in diameter can generate between 2 and 10 megawatts from a single unit.

A comprehensive scaling architecture ensures consistent performance characteristics and efficiency metrics across multiple size configurations. The scaling parameters range from an 8-inch micro configuration producing 10 kW at an approximate cost of $7,000, through intermediate sizes (5-foot generating 1 MW, 10-foot generating 2 MW, 15-foot generating 3 MW), to large-scale implementations (up to 45-foot diameter producing 9 MW at an approximate cost of $900,000). This systematic scaling approach is based on mathematically defined relationships between dimensional increases and corresponding component specifications, ensuring proportional performance metrics while maintaining optimal fluid dynamics.

Production costs vary depending on turbine size and configuration, with the 8-inch turbine unit having an approximate production cost of $15,000 per unit at initial manufacturing scale. The modular design allows for production scaling across a size range from 5 inches to 50 feet in diameter, with proportional increases in output capacity as dimensions increase.

Personal Device Applications

On a small scale, miniaturized turbines can be incorporated into personal devices such as vaporizers or electronic cigarettes, where the user's breath drives a micro-turbine to generate electricity, eliminating the need for batteries. A micro turbine is a small-scale turbine designed to generate electricity or mechanical power from fluid flow, such as air or water. Micro turbines often operate at high rotational speeds and can be used in environments with limited space or lower energy demands.

Turbine

The turbine can be used to generate electrical current from liquids and gases. The liquids may include organic liquids and/or inorganic liquids, including but not limited to water. The gases may include but are not limited to air and petrochemically derived gases. The turbine may also be used with ionized phases, such as any type of water, salt, still air, or ionic gases like plasma and transitional states like gels. The system may include two cylinders containing blades that rotate with tidal and wind movements, along with an inversion box that attaches to electricity wires running along bridges and powerline structures.

The turbine system may be designed for bidirectional energy flow, enabling it to function as both a generator and a motor. In energy storage mode, the system consumes electricity to store potential energy in reservoirs or compressed air systems, and when demand increases, it converts stored energy back into electricity. For tidal applications, the system incorporates a bidirectional flow mechanism with dual flow gates positioned on opposite sides of the turbine assembly, each equipped with a one-way valve mechanism that responds to water pressure and flow direction. The dual flow gates ensure unidirectional rotation of the turbine blades, enabling continuous power generation throughout the tidal cycle. When tidal water flows in one direction, the first flow gate opens to direct water through the turbine blades while the second flow gate remains closed; when the tide reverses, the first flow gate closes, and the second opens, ensuring unidirectional rotation of the turbine blades despite the bidirectional nature of tidal flow. The flow gates may operate passively, actuated by water pressure, or actively, controlled by sensors that detect changes in tidal direction.

To protect internal components, the system may feature a cover that prevents debris from entering the turbine blades or internal mechanisms. For wind applications, the turbine may resemble a Dyson fan shape with a protective mesh covering to ensure safe airflow and bird protection.

In some embodiments, the turbine may include a filtration system.

In some embodiments, magnets may be directly attached to the turbine wheel, further contributing to the system's ability to efficiently convert kinetic energy into electrical energy.

Power may be harvested from flowing water with certain velocity under specified heads using hydro turbine generators. The rotating magnets and turbine could be snap fitted in a fixed stator having, for example, 12 coils. The blades, hub, seals, and rotor may be free to rotate under whirling speed of water. The stator with magnetic coils may be fixed with cage and, for example, an 8 inch pipe. The seals are generally designed to avoid the leakage of water from turbine to generator side.

Blades

The turbine system incorporates specialized blade designs tailored to the medium and expected flow rate, optimizing energy capture and torque distribution while ensuring the continuation of media flow. Blade count, shape, and material composition are adjusted based on the intended application, with lightweight polymer blades used for wind applications and robust metal alloy blades employed for high-pressure water environments. For automotive applications, aerodynamically optimized blades capture energy from airflow during vehicle operation. In some embodiments, the blades feature a variable pitch mechanism that automatically adjusts to optimize energy capture across varying flow conditions. The modular blade attachment system allows for the replacement of individual blades without requiring disassembly of the entire turbine structure.

Marine applications utilize blades with hydrodynamic profiles specific to water flow characteristics. Marine applications generally include orientational stability systems that maintain optimal energy capture despite vessel movement or changing current directions.

A turbine optimized for pipeline installations may include a specially engineered blade system with optimized pitch and curvature to maximize energy capture while minimizing flow restriction.

The system generally employs an inverted blade design, where blades extend inward from an outer ring, creating a central void for fluid flow and enabling mounting around existing structures such as pipes, bridges, and power lines. This configuration increases energy capture efficiency and is adaptable for axial or radial flow applications. Additionally, the system supports modularity, allowing adaptation to various environments and applications by altering materials, blade configurations, and motor types.

In some embodiments, the system may have retractable blades that respond to intelligent sensors during adverse conditions, ensuring protection and operational longevity. For example, the blades may feature an Iris shutdown design, which deploys as required to protect the turbine.

Conversion

The turbine system incorporates a five-layer crystal conversion system designed to efficiently direct electricity to the power grid while ensuring consistent energy flow. The five-layer crystal conversion system utilizes multiple layers of crystal elements, such as quartz, to rectify and optimize electrical current for commercial output. This system is designed to ensure consistent energy flow, regulate positive and negative charges during inversion processes, and integrate seamlessly with power grids. It leverages the piezoelectric and resonance properties of crystals to enhance energy storage and distribution efficiency. The five-layer technology is a computerized system for memory centers, encased in lightweight fiberglass material, which facilitates precise frequency control and seamless integration with the electrical grid. This innovative system utilizes multilayer chip technology to rectify electrical current for commercial output, enabling efficient integration with existing powerline structures, such as those found around bridges and within bridge designs. This capability allows electricity to be redirected to other areas within the interconnected system, maintaining consistent energy delivery across the network.

Thermal Management

The system may also incorporate a comprehensive thermal management system with heating elements to prevent freezing of mechanical components and seals in cold climates and cooling channels to dissipate heat during high-output operation, ensuring reliable performance in challenging environments. The thermal management system may also support the functionality of the five-layer crystal conversion system by regulating negative and positive charges during inversion processes. The thermal management system may include components such as cooling channels circulating ambient fluid, heating elements embedded within the turbine housing, temperature sensors positioned throughout the turbine assembly to continuously monitor operating conditions and activate heating or cooling systems as needed, thermal insulation layers, and control mechanisms to ensure consistent performance and prevent damage caused by extreme temperatures.

Materials

The system incorporates advanced materials to enhance performance, reduce weight, and maximize durability. These materials improve thermal conductivity and resist environmental degradation, extending the system's operational lifespan to 50-100 years. Material selection is tailored to the deployment environment, with specialized compositions for marine applications requiring enhanced corrosion resistance, automotive applications demanding thermal stability, and aerospace applications prioritizing maximum weight reduction. Bearing assemblies are tailored to specific environments, with ceramic bearings used for high-temperature applications and sealed stainless-steel bearings for marine environments. For high-temperature or corrosive gas applications, critical components such as turbine blades and housing are constructed from titanium alloys, offering excellent strength-to-weight ratios and corrosion resistance. Wind and tidal applications primarily utilize advanced polymer composites and fiber-reinforced materials, which reduce weight and enable faster response to low-energy fluid flows while maintaining structural integrity. For specialized high-performance applications, carbon fiber composites are employed to provide maximum strength with minimal weight. Large-scale production models utilize injection-molded fiber-reinforced polymers, significantly reducing manufacturing costs compared to machined metal components. Electrical components are encased in waterproof housings with IP67 or higher protection ratings for underwater applications.

In some embodiments, turbine components are manufactured using fiberglass materials, with parts molded using fiberglass molds to provide a cost-effective and durable solution.

The tide and wind-powered turbine, converter, and storage system can be constructed entirely from 100% recycled materials, making it an environmentally sustainable solution for energy generation. The copper and aluminum from bridge structures may also act as effective conduits, facilitating the electrochemical processes necessary for energy storage.

The primary turbine system structural components are generally constructed from lightweight poly-fiber reinforced with graphene composites, which provide an exceptional strength-to-weight ratio while resisting environmental degradation. This innovative material composition extends the system's operational lifespan to 50-100 years, far exceeding the 20-25-year industry standard for conventional turbine systems. The integration of graphene into the composite structure improves thermal conductivity, enabling efficient heat dissipation during high-output operation, while also enhancing electrical conductivity where applicable.

Motor

In some embodiments, the turbine system incorporates an axial radial flux motor. An axial radial flux motor is a type of electric motor that combines axial flux and radial flux configurations to optimize energy conversion efficiency and torque generation. In this design, the magnetic flux flows both parallel to the axis of rotation (axial flux) and radially outward from the center (radial flux), enabling enhanced performance compared to conventional motors. This configuration is particularly suited for applications requiring high torque density and compact form factors. The design eliminates the need for gearboxes in many applications, reducing system complexity, maintenance requirements, and energy loss. This motor comprises a stator assembly and a rotor assembly, with the rotor featuring high-strength permanent magnets arranged in a specific pattern to intensify the magnetic field. Strategically positioned additional magnets further enhance the magnetic flux density, enabling efficient energy harvesting even under low-flow conditions. This enhanced magnetic configuration significantly increases torque compared to conventional motors, enabling efficient energy harvesting even under low-flow conditions. For example, an 8-inch turbine equipped with this motor can produce approximately 660 newton meters of torque at operational speeds.

Electricity generation in the turbine system can be achieved through various motor technologies, ranging from conventional designs to advanced configurations optimized for specific applications. At its most fundamental level, electric generation may be achieved using a rotor and stator assembly or, alternatively, a piezoelectric motor that leverages the natural electric characteristics of crystals. These foundational principles provide the basis for the turbine system's energy conversion capabilities.

The turbine system may include a two-piece motor assembly having two separate segments with complementary electrical connection interfaces that align and engage when assembled around structural elements such as bridge supports or pylons. This design facilitates installation and operation in challenging environments. This configuration allows the motor to be assembled and sealed in situ while maintaining proper alignment and electrical connections. A watertight seal is provided along the junction between the segments to maintain proper connections and prevent water intrusion, ensuring reliable operation in tidal or marine environments.

In some embodiments, the turbine system utilizes a radial flux type electric motor, which is designed to reduce the need for gear drives, thereby optimizing space utilization and simplifying the overall system architecture.

In a non-limiting example, a frameless motor kit, such as the LS series model LSI 267-58, offers exceptional torque-to-weight ratio and zero cogging for precision movement.

This motor provides continuous rated torque of up to 24.4 N-m at a maximum speed of 2200 RPM, with peak torque capabilities of 191 N-m for short durations. It delivers a maximum continuous power output of 5621 W, with peak power capabilities of 44003 W. Electrical parameters include a voltage constant of 3.060 Vpk/rad/s, a torque constant of 3.748 N-m/ARMS, and terminal resistance of 2.086 Ohms at 20° C. The motor incorporates 34 magnet poles and terminal inductance of 283 H. Its zero-cogging design ensures consistent rotational speed under variable input conditions, enabling smooth energy generation even during low-energy fluid movement phases.

The turbine system may employ a novel crystal motor in some embodiments. The crystal motor utilizes the piezo-electric and energy conversion properties of quartz crystals. This motor generates electricity by leveraging piezoelectric effects and crystalline resonance, providing higher efficiency across variable input conditions. The motor includes strategically positioned quartz crystal elements within a stationary housing, interacting with moving components to produce electrical current. The crystal motor reduces reliance on rare earth materials and offers advantages in weight and efficiency. Multiple layers of crystal elements may be incorporated to enhance energy generation and storage capabilities, making this motor a direct replacement for conventional axial radial flux motors. Crystal elements are manufactured with specific dimensional tolerances and crystallographic orientations to enhance energy conversion properties while maintaining structural integrity under stress. This technology is particularly advantageous in variable-input environments, maintaining higher efficiency across a broader range of conditions compared to conventional systems.

Energy Storage

For remote locations, the system can operate in "island mode", storing generated energy in attached battery systems. In some embodiments, such as at 2 Kw-5 Kw continuous output, the units may be deactivated when the batteries are fully charged.

One embodiment of the energy storage system utilizes a saltwater battery integrated into bridge structures. A saltwater battery is a type of energy storage device that uses a saline solution as the electrolyte to facilitate the flow of ions between electrodes during charge and discharge cycles. These batteries are typically non-toxic, environmentally friendly, and rely on abundant materials such as saltwater and carbon-based electrodes, making them a sustainable alternative to conventional batteries. They are often used in applications requiring safe, long-lasting, and low-cost energy storage. This pressurized battery pack system is enclosed within a bridge leg and leverages the interaction between the bridge's metals, copper wires, and saltwater to create continuous electricity storage.

In another embodiment, the turbine system may employ a solid-state battery that incorporates advanced materials and natural elements to optimize performance. For example, graphene and borophene may be used as conducting media, combined with electrolytes containing natural materials such as quartz crystal, sea coral, and seawater components. These materials are selected for their ability to enhance the battery's energy density, conductivity, and overall efficiency.

The battery designs may also include ergonomic considerations, with some embodiments featuring hexagonal-shaped batteries. This unique shape is intended to improve ergonomic utilization, reduce environmental impact, and enhance structural strength. The hexagonal design allows for better space optimization and may contribute to the overall durability of the battery system.

Vibration Damping

To address vibration concerns, the turbine system generally includes rubber harmonic absorbers that isolate operational components from supporting structures, preventing resonant frequencies from affecting infrastructure such as bridges and power lines. In marine applications, these absorbers also serve as protective buffers against collisions with boats or debris.

For example, the turbine system may incorporate a rubber buoy system that serves multiple functions, beginning with its role as a protective layer to shield the turbine from large boats and floating debris. This buoy system also acts as a grounding vibration frequency monitor, ensuring stable operation of the turbine and its associated energy storage components. Additionally, the buoy system plays a secondary role in managing battery storage pressure, contributing to the overall stability and efficiency of the energy storage system.

Custom-machined press sleeves, manufactured from AL6061-T6 using CNC processes, provide precise alignment and secure bearings within the assembly. These advanced mounting and connection systems ensure proper alignment, manage vibration, and maintain reliable operation despite external forces, making the turbine adaptable to diverse environments.

Each installation configuration incorporates appropriate sealing and vibration isolation mechanisms specific to the mounting environment, ensuring optimal performance and longevity regardless of deployment location. The turbine system utilizes a comprehensive suite of specialized fasteners and coupling components designed for maximum strength, corrosion resistance, and vibration tolerance in various operating environments. For example, super-corrosion-resistant 316 stainless steel socket head screws in various dimensions are used to secure components while maintaining structural integrity in marine and high-moisture environments. Critical connections employ alloy-steel 12-point screws for applications requiring higher torque retention, while ultra-low-profile precision shoulder screws are used for precise alignment of components in space-constrained areas. Threaded connections are sealed with specialized threadlocker to prevent loosening due to vibration while allowing disassembly during maintenance. Permanent connections are bonded with toughened epoxy structural adhesive, and wedge lock washers prevent fastener loosening in high-vibration environments. This fastening system ensures mechanical stability across all operating conditions while accommodating thermal expansion and contraction cycles experienced during normal operation.

EXAMPLE

In an example, a prototype turbine having a diameter of about 6 inches to about 8 inches exhibited the following parameters.

| Factor | Model 1 |
| --- | --- |
| RPM, (N), RPM | 10 to 42 not expected to exceed 50 |
| Power, P, Nm | 2,204.74 |
| Torque (T), Nm | 666.08 at 32 rpm |
| Electrical Power, (Pelectrical), watts | 2,202.87 at 32 rpm |

The study was designed for a small 6 kw hydro turbine generator that could be fitted in an 8 in diameter pipe. The blades were fitted on a hub with a plastic/rubber seal covering rotating magnets which are radially equi-spaced on a periphery of the turbine hub.

The prototype integrates all core system components, including the housing assembly, blade system, bearing assembly, and electrical generation components, into a compact form factor designed for easy installation in standard 8-inch diameter piping. Testing protocols validate power generation at specified fluid flow rates, correlate computational fluid dynamics (CFD) simulation results with actual performance data, characterize the RPM versus pressure drop curve, and confirm self-start capabilities. The prototype serves as a validation platform for subsequent scaled implementations, ensuring consistent performance and reliability across a wide range of system applications.

In controlled testing conditions, the prototype maintained consistent operation at 1800 RPM, generating 2.5 kilowatts of power continuously for a minimum of 2 hours without requiring adjustment or operator intervention. The system's power curve correlated directly with fluid flow rates, demonstrating efficiency even at reduced flow velocities. Empirical performance testing confirms the theoretical calculations for power generation, with actual performance data collected across multiple operating conditions including varied flow rates, temperatures, and installation configurations. The performance specifications have been validated through both computational fluid dynamics (CFD) simulations and physical testing of prototype units, establishing correlation between simulated and actual performance characteristics.

Figure 2:
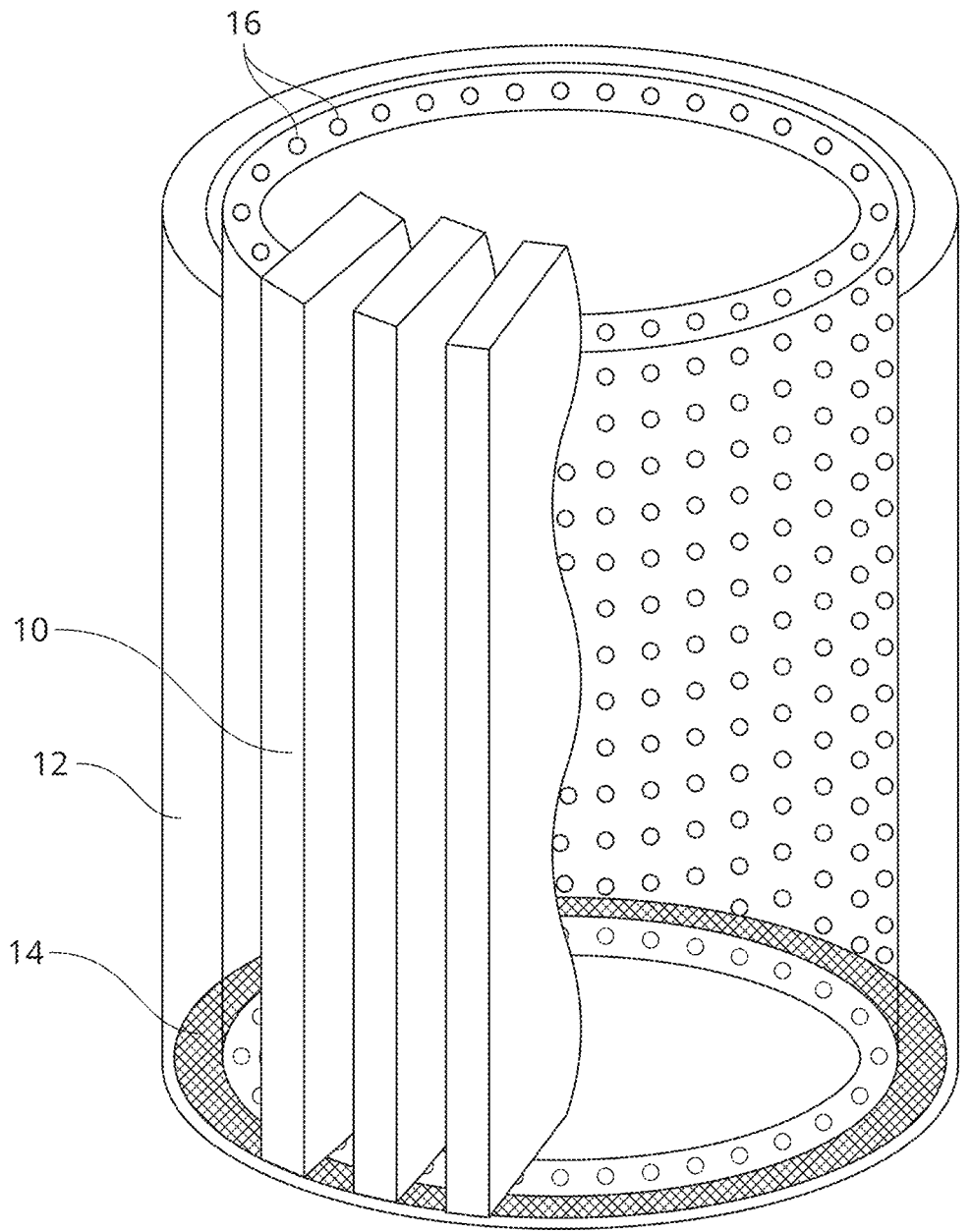
FIG. 2 is a detailed schematic view thereof.

Referring to FIGS. 1-9, FIG. 1 illustrates a wave blade inverted fan turbine system 10 with a quartz crystal ball bearing conversion system 16 mounted on round bridge pilings 18. The turbine system 10 is protected by an outer rubber protection cover 12 and mesh protection 14, which shield the internal components from environmental elements, marine life, and debris. FIG. 2 shows the ball bearings 16 (e.g., ball bearings embedded with quartz crystals or a turbine barrel coated or lined with quartz crystal) distributed around the circumference of the turbine system 10 within the protection cover 12 to reduce friction and maintain precise rotational alignment during operation. The turbine system 10 is designed to extract kinetic energy from fluid flow, such as tidal currents, and convert the extracted energy into electrical energy.

Figure 3A:
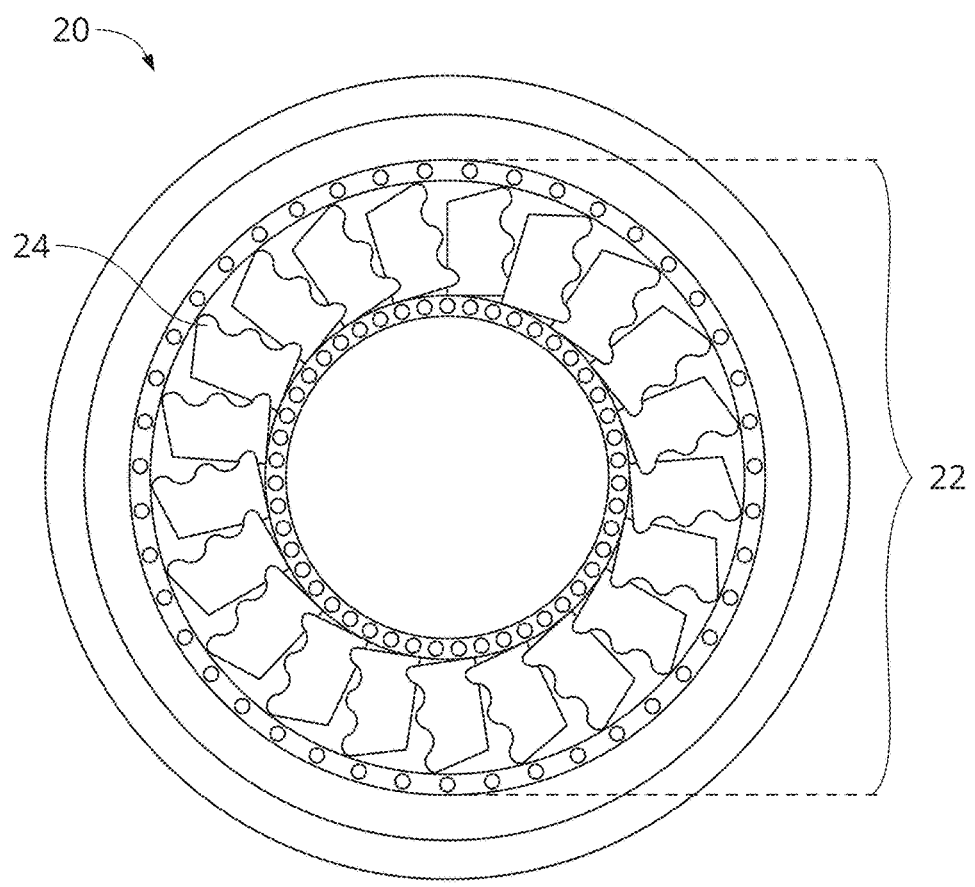
FIG. 3A is a schematic view of an inverted turbine system according to an embodiment of the present invention.
Figure 3B:
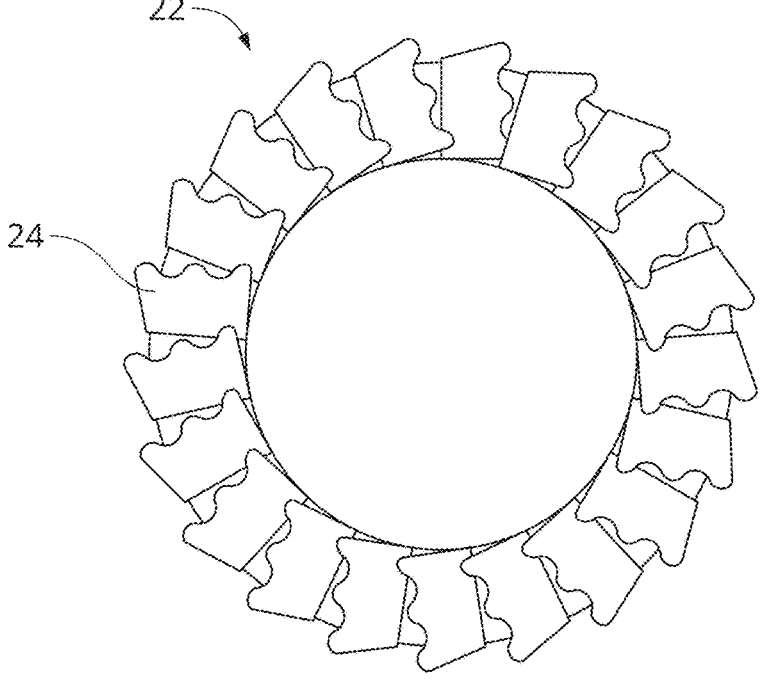
FIG. 3B is a schematic view of a blade assembly thereof.

FIGS. 3A and 3B depict an inverted turbine system 20 comprising a blade assembly 22 with a plurality of turbine blades 24. The blades are mounted on the inner circumference of a ring or donut-shaped structure, creating a central void for fluid flow. This inverted configuration enables the blades to intercept fluid flow from the outer perimeter, optimizing energy capture efficiency while maintaining a compact form factor. The turbine system 20 is adaptable for axial or radial flow designs and can be mounted around existing structures such as pipes, bridge supports, or power line structures.

Figure 4:
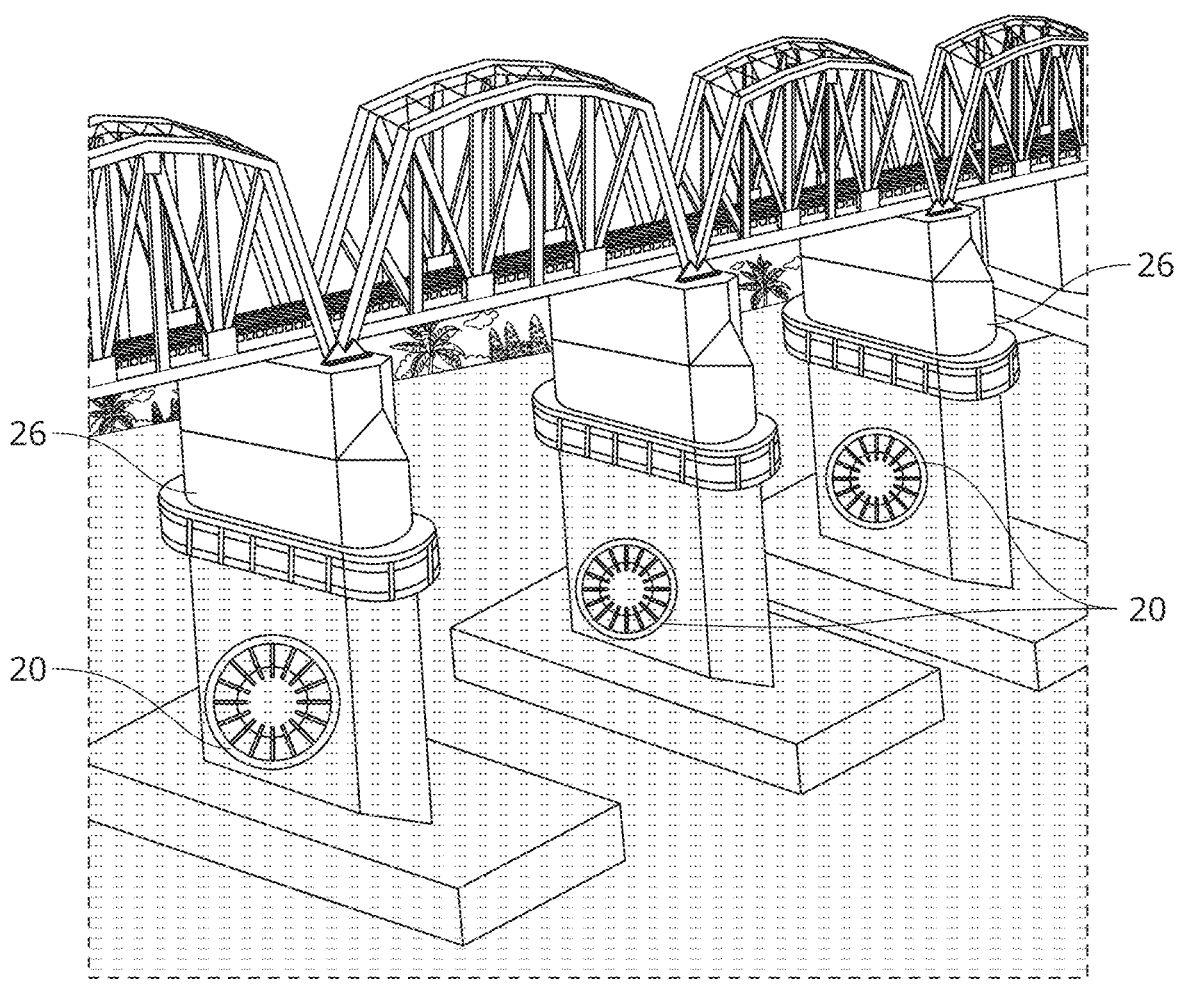
FIG. 4 is another schematic view of the turbine system of FIG. 3A, shown in an installed position underwater.

FIG. 4 illustrates the inverted turbine system 20 installed on bridge pilings 26. The turbine system 20 is designed to harness kinetic energy from tidal currents or wind and convert it into electrical energy. The compact design allows the turbine to be mounted around existing structural elements without significant modifications, ensuring efficient operation in challenging environments.

Figure 5:
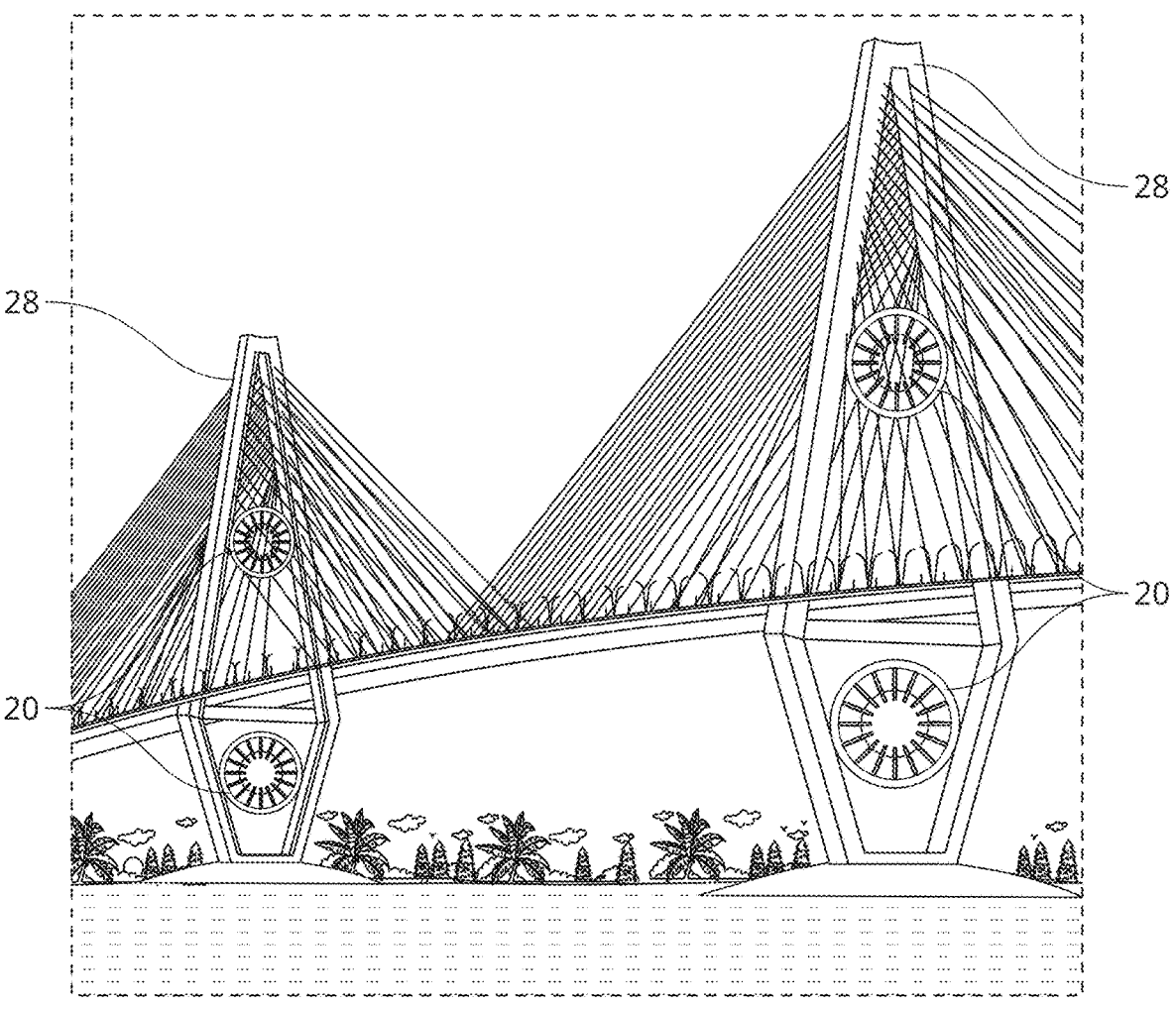
FIG. 5 is another schematic view of the turbine system of FIG. 3A, shown in an installed position on a bridge structure.

FIG. 5 shows the inverted turbine system 20 installed on bridge structural members (BSM) 28. The turbine system 20 is strategically positioned to harness natural energy sources, such as wind currents at elevated positions or tidal flows near the base of the structure. The integration with BSM 28 highlights the system's versatility and suitability for deployment in diverse environmental conditions.

Figure 6:
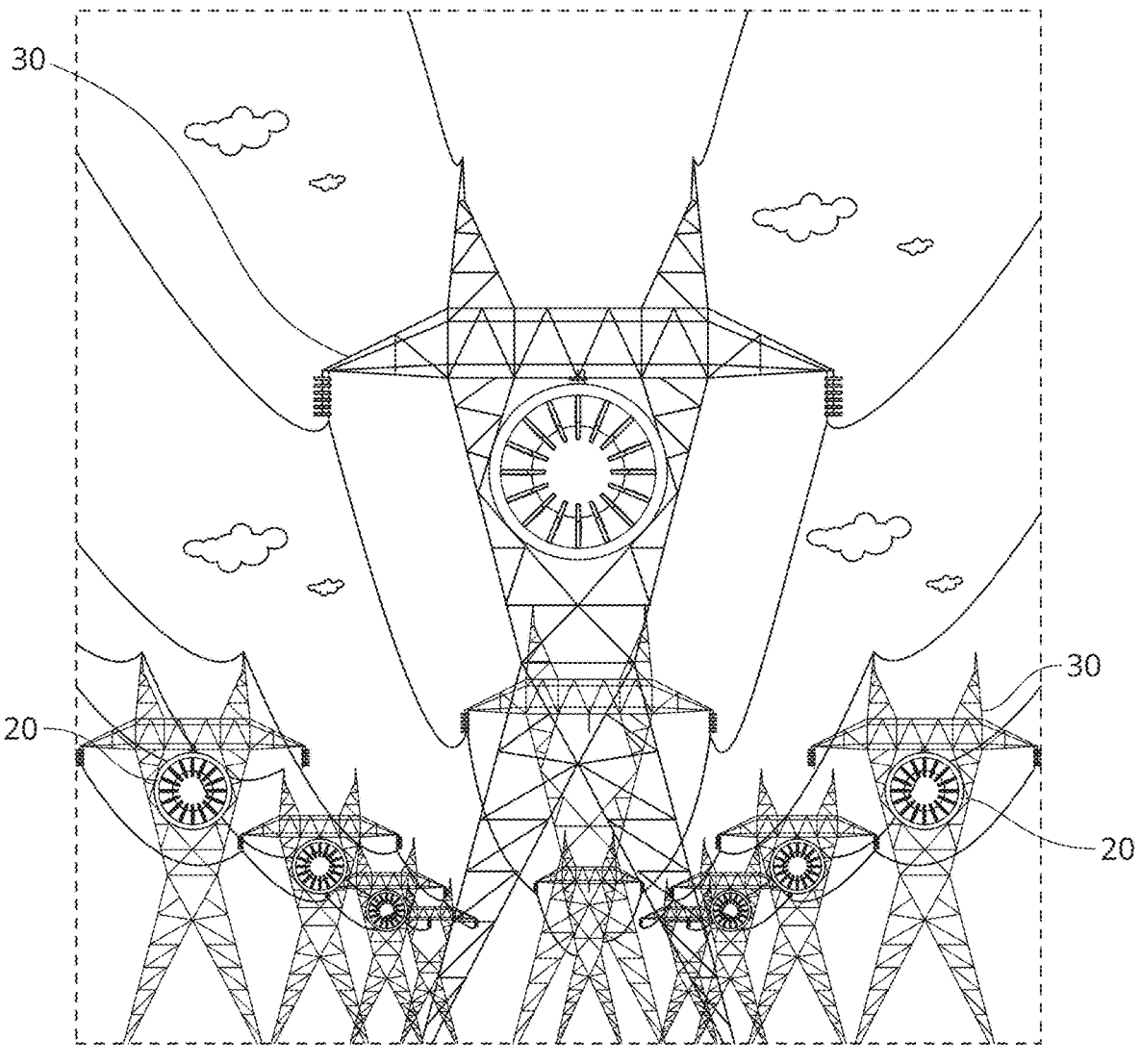
FIG. 6 is another schematic view of the turbine system of FIG. 3A, shown in an installed position on a transmission tower.

FIG. 6 illustrates the turbine system 20 installed on a transmission tower 30. The turbine system 20 is designed to extract kinetic energy from wind currents and convert it into electrical power. The inverted blade configuration allows the turbine to be mounted around existing structural elements, such as transmission towers, without requiring significant modifications.

Figures 7, 8:
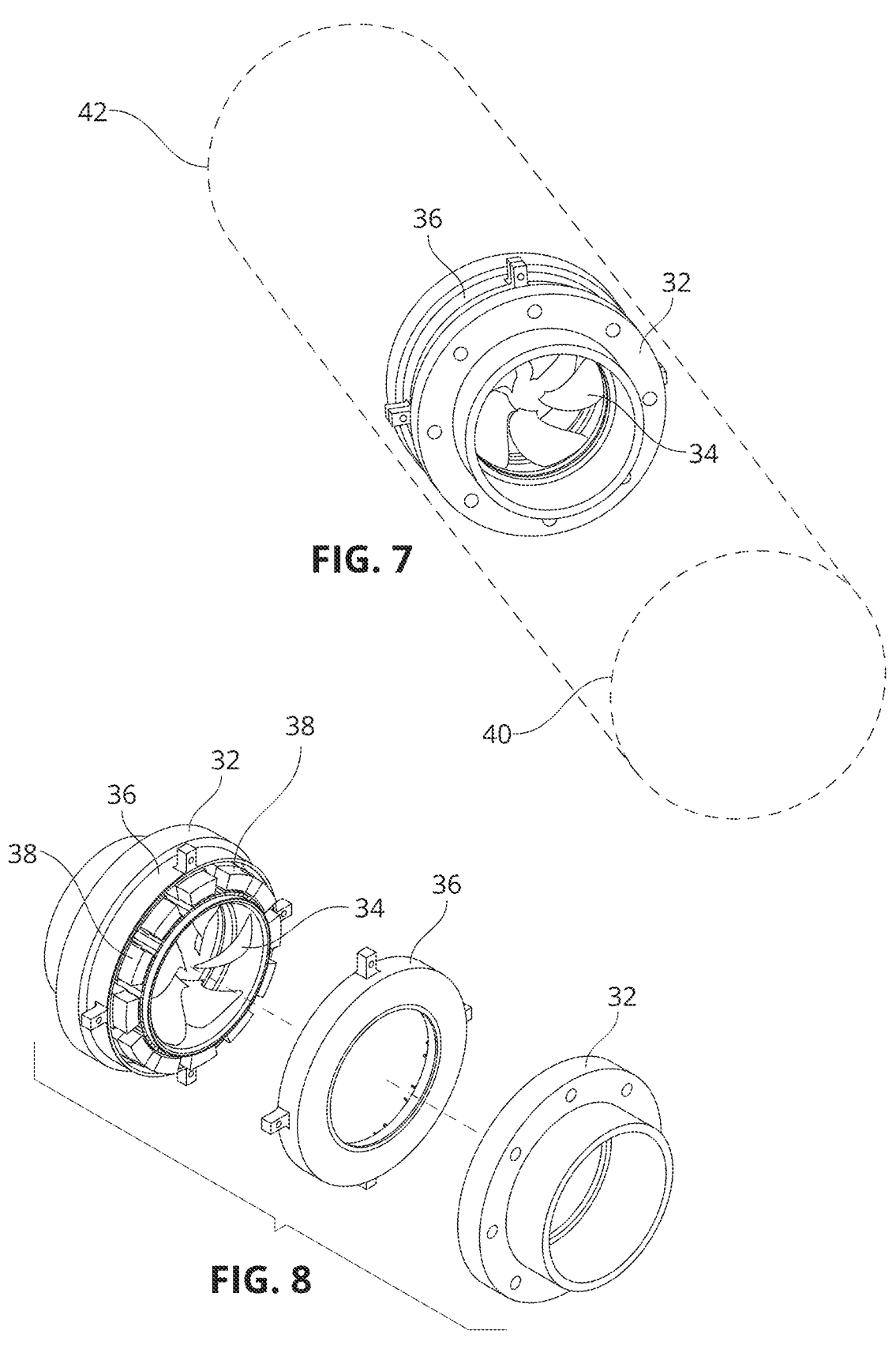
FIG. 7 is a schematic view of a turbine system according to another embodiment of the present invention, shown in an installed position in a pipe.
FIG. 8 is an exploded view thereof.

FIGS. 7 and 8 depict a turbine system 10 installed within a pipe, comprising a flange 32, turbine blade 34, bearing cover 36, magnet 38, inlet 40, and outlet 42. The turbine system 10 is designed to extract kinetic energy from fluid flow within the pipe and convert it into electrical energy. The flange 32 secures the turbine system 10 within the pipe, while the turbine blade 34, with optimized curvature and pitch, enhances energy capture. The bearing cover 36 protects internal components, and the magnet 38 facilitates energy conversion by interacting with the rotational motion of the blade. The inlet 40 and outlet 42 ensure smooth fluid flow through the system, minimizing turbulence and backpressure.

Figure 9:
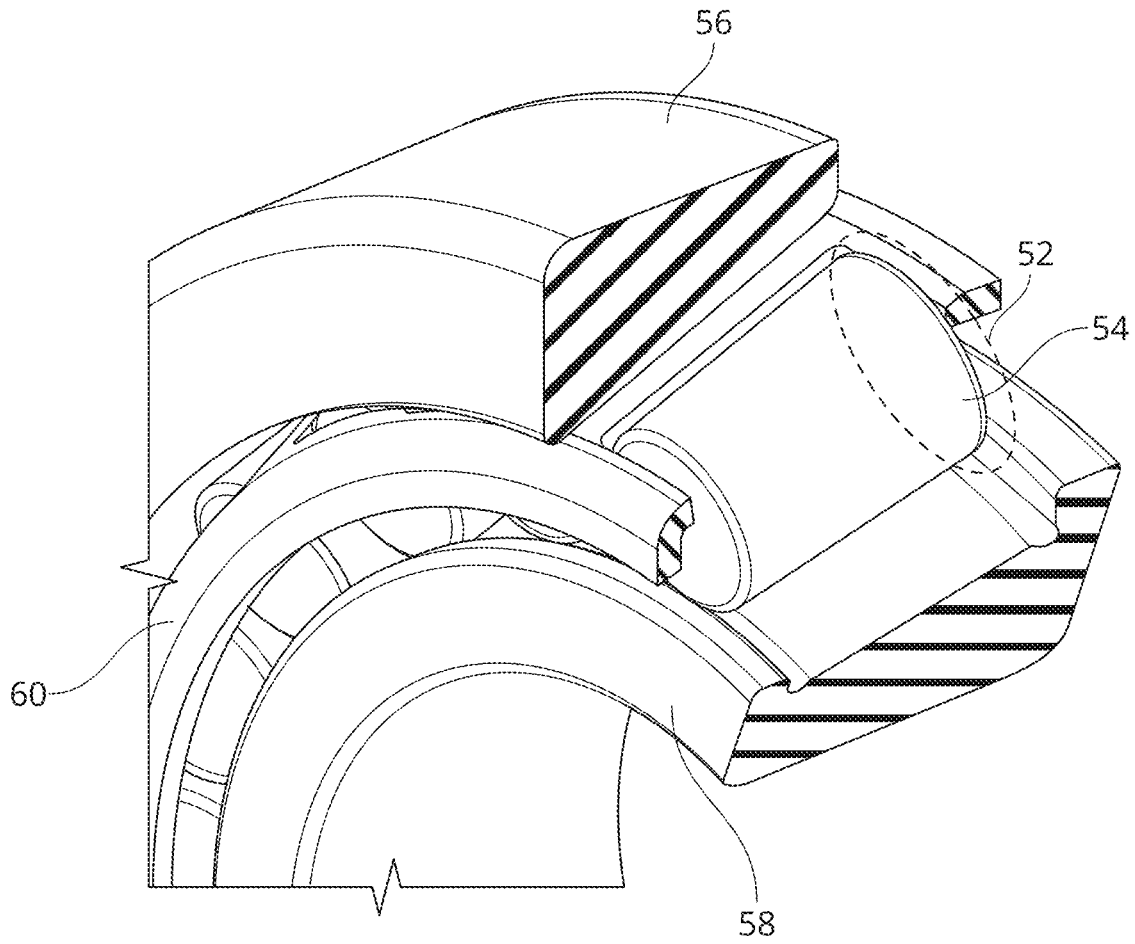
FIG. 9 is a detail sectional view of a roller bearing assembly located within a turbine system according to an embodiment of the present invention.

FIG. 9 provides a detailed cross-sectional view of a roller bearing assembly of a turbine system according to an embodiment of the present invention. The assembly includes a ring 52, roller bearing 54, outer race 56, inner race 58, and retainer 60. The ring 52 serves as the structural housing for the roller bearing assembly, providing stability and support. The roller bearing 54 is positioned between the outer race 56 and the inner race 58, allowing for low-friction rotational movement. The outer race 56 and inner race 58 are precision-engineered to maintain proper alignment and ensure consistent performance during operation. The retainer 60 secures the roller bearing 54 in place, preventing displacement and ensuring reliable operation under varying load conditions. This configuration ensures smooth rotational motion, precise alignment, and durability under operational stresses. Constructed from high-strength, corrosion-resistant materials, the bearing assembly minimizes friction and wear, contributing to the turbine system's efficiency and longevity in harsh environments.

It should be understood, of course, that the foregoing relates to exemplary embodiments of the invention and that modifications may be made without departing from the spirit and scope of the invention as set forth in the following claims.

What is claimed is:

1. An electricity generation system comprising:
(a) an energy extractor operative to extract kinetic energy from a fluid flow;
(b) an energy transmitter electrically coupled to the energy extractor; and
(c) an energy dissipator electrically coupled to the energy transmitter;
wherein the energy extractor comprises: at least one blade assembly mounted to an annular race, the blade assembly including a plurality of blades extending from the annular race and converging radially inward toward a longitudinal axis of the energy extractor; and
a roller bearing positioned between the annular race and an outer race; and
a retainer mounted to the energy extractor adjacent to the roller bearing.

2. The electricity generation system of claim 1, wherein the energy extractor is a turbine having an axis of rotation parallel to the fluid flow.

3. The electricity generation system of claim 2, wherein the turbine is mounted to a bridge or an electricity transmission tower.

4. The electricity generation system of claim 2, wherein the turbine is mounted within a pipe.

5. The electricity generation system of claim 2, where the turbine further comprises magnets mounted to a wheel.

6. The electricity generation system of claim 2, further comprising an inversion box electrically communicating with an electric grid.

7. The electricity generation system of claim 2, wherein the turbine further comprises a protective casing.

8. The electricity generation system of claim 2, wherein the turbine comprises retractable blades.

9. The electricity generation system of claim 2, wherein the turbine further comprises a plurality of ball bearings.

10. The electricity generation system of claim 1, wherein the energy transmitter is selected from the group consisting of: a hydraulic pump with an electrical circuit; electric power line; an air compressor; a water pump; and any combination thereof.

11. The electricity generation system of claim 1, wherein the energy dissipator is selected from the group consisting of: a generator; an air-driven tool; a battery array; water having a temperature that rises upon transmission of the energy; an electric motor; and any combination thereof.

12. The electricity generation system of claim 1, further comprising an energy storage device selected from the group consisting of a pressure accumulator; a compressed air storage tank; an elevated water tank; and a battery array.

13. The electricity generation system of claim 12, wherein the battery array comprises a battery selected from the group consisting of: a saltwater battery; a solid-state battery; and any combination thereof.

14. An inverted turbine apparatus for generating electrical energy from a fluid flow, comprising:

at least one housing having an outer peripheral wall defining a central void adapted to permit fluid passage;

at least one blade assembly mounted on an annular race disposed within the housing, the blade assembly including a plurality of turbine blades extending from the annular race radially inward toward the central void;

at least one motor assembly operatively coupled to the blade assembly, such that the motor assembly comprises a rotor incorporating high-strength permanent magnets and a stator configured to convert rotational energy into electrical energy;

at least one bearing assembly comprising a plurality of roller bearings positioned between the annular race and an outer race, with a retainer mounted adjacent to the plurality of roller bearings; and at least one mounting interface configured to secure the housing to a support structure, wherein the bearing assembly is configured to enable rotational movement of the blade assembly; and wherein the inverted turbine apparatus is operative to convert kinetic energy of the fluid flow into electrical energy.

15. The inverted turbine apparatus of claim 14, further comprising at least one variable pitch mechanism operatively connected to the blade assembly for dynamically adjusting the orientation of the turbine blades in response to the fluid flow conditions.

16. The inverted turbine apparatus of claim 14, further comprising at least one protective cover disposed at least partially around the housing and blade assembly so as to shield the components from environmental debris.

17. A method of electricity generation, comprising:

mounting inverted turbine apparatus of claim 14 on a selected installation site having a fluid flow;

extracting kinetic energy from the fluid flow by allowing the turbine blades to rotate as the fluid impinges upon an outer annular region of the blades;

converting the extracted kinetic energy into electrical energy by driving an electric motor, the motor being operatively coupled to the turbine;

transmitting the electrical energy through an inverter configured for high-voltage alternating current output to an electrical grid; and storing excess electrical energy in an energy storage device.

18. The method of claim 17, further comprising operating the turbine in a bidirectional fluid flow environment by directing fluid through a flow gate mechanism configured to maintain unidirectional turbine rotation during alternating flow conditions.

19. The method of claim 17, further comprising automatically monitoring environmental conditions via integrated sensors and, in response thereto, adjusting a variable pitch mechanism to modulate blade orientation in accordance with changes in fluid flow or adverse weather conditions.

* * * * *